(12) United States Patent
Portney et al.

(10) Patent No.: US 8,622,445 B1
(45) Date of Patent: Jan. 7, 2014

(54) RUB RAIL ASSEMBLY

(71) Applicant: International Truck Intellectual Property Company, LLC, Lisle, IL (US)

(72) Inventors: Robert Portney, Naperville, IL (US); Matthew Gschwind, Chicago, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/743,517

(22) Filed: Jan. 17, 2013

(51) Int. Cl.
*B60R 13/04* (2006.01)

(52) U.S. Cl.
USPC .......................................... 293/128; 296/1.08

(58) Field of Classification Search
USPC ................ 293/126, 128; 296/152, 1.07, 1.08; 52/716.4, 716.6, 718.04, 718.06
See application file for complete search history.

(56) References Cited

U.S. PATENT DOCUMENTS

| | | | | |
|---|---|---|---|---|
| 4,666,196 A * | 5/1987 | McCoy et al. | ................ | 293/128 |
| 4,946,727 A * | 8/1990 | Kessler | .......................... | 428/99 |
| 5,186,509 A * | 2/1993 | Tyves | ........................... | 52/716.5 |
| 5,202,172 A * | 4/1993 | Graf | ............................... | 428/100 |
| 5,229,175 A * | 7/1993 | Seabolt | .......................... | 428/31 |
| 5,368,903 A * | 11/1994 | Trier | ............................... | 428/31 |
| 5,536,540 A * | 7/1996 | Borys et al. | ..................... | 428/31 |
| 6,681,543 B2 * | 1/2004 | Nada et al. | .................... | 52/716.5 |
| 6,910,722 B2 * | 6/2005 | Takeda et al. | ................. | 293/128 |
| 7,013,546 B2 | 3/2006 | Dykema | | |
| 7,121,060 B1 * | 10/2006 | Cittadini et al. | ............. | 52/716.5 |
| 7,163,244 B2 * | 1/2007 | Meltzer | ........................ | 293/128 |
| 7,578,546 B2 | 8/2009 | Grady | | |
| 7,651,133 B2 | 1/2010 | Branning | | |
| 7,857,366 B2 * | 12/2010 | Michael et al. | ............... | 293/126 |
| 8,196,958 B2 | 6/2012 | Cordea | | |
| 8,303,005 B1 * | 11/2012 | Hill | .............................. | 293/126 |

* cited by examiner

*Primary Examiner* — Glenn Dayoan
*Assistant Examiner* — Gregory Blankenship
(74) *Attorney, Agent, or Firm* — Jeffrey P. Calfa; Mark C. Bach

(57) ABSTRACT

A rub rail assembly for a side wall surface of a vehicle includes a cleat support having a first body portion and a second body portion. The first body portion has a first fastener receiving hole for fastening the cleat support to the side wall surface of the vehicle, and the second body portion has an engagement structure. The rub rail has a hook that is engageable with the engagement structure of the support cleat to permit the rub rail to hang from the support cleat.

8 Claims, 3 Drawing Sheets

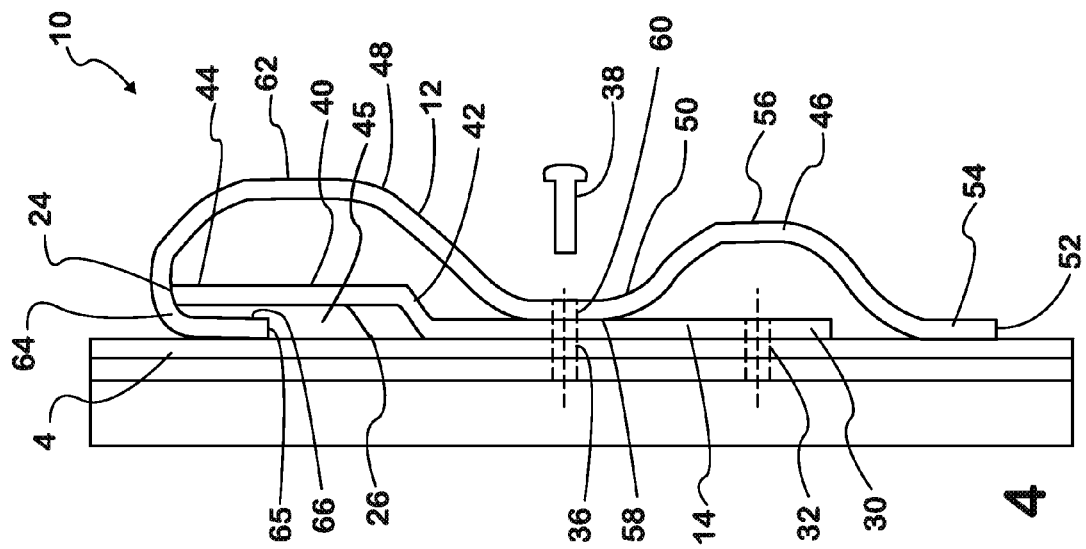
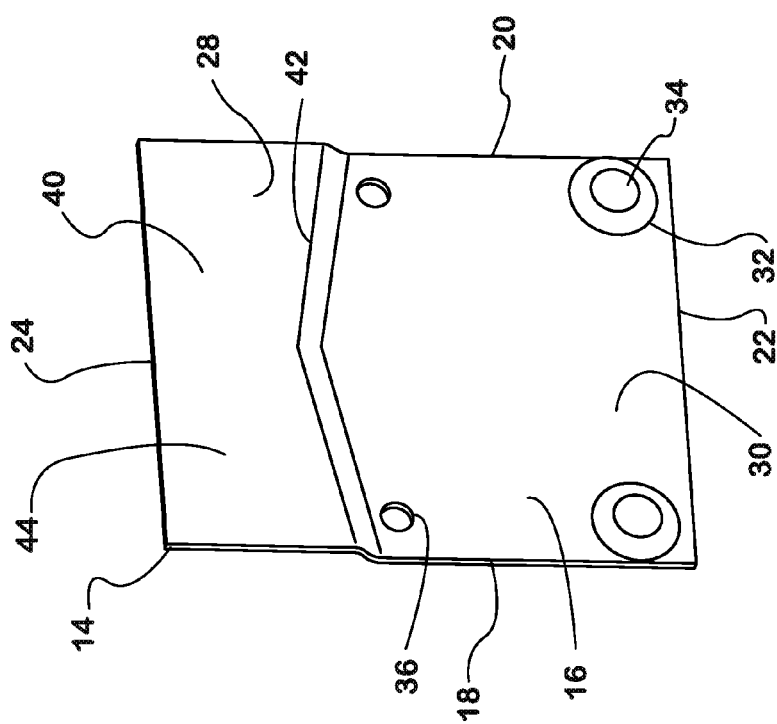

RUB RAIL ASSEMBLY

BACKGROUND

Embodiments described herein relate generally to a rub rail assembly including a rub rail for protecting wall surfaces from impacts and abrasions, and more particularly, to a rub rail assembly including a support member for the rub rail.

In buses and other vehicles, the side wall surfaces are often protected from impacts and abrasions with rub rail assemblies, which often include a shock-absorbent rub rail. Often the rub rail assembly includes a rail support that is attached to the side wall surface, and a rubber or plastic rub rail that is attached to the rail support. In addition to side wall surfaces, rub rail assemblies are also used on vehicle doors and fenders. Rub rail assemblies are also used in applications other than vehicles, such as marine docks, boats, shelving, display cases, among other applications.

Referring to FIGS. 1 and 2, rub rail assemblies 1 for buses and other vehicles 2 that are known today include a rub rail 3 that is fastened to the side wall surface 4 of the vehicle. Typically, multiple rub rails 3 are fastened to the side wall surface 4 in a parallel arrangement, with fasteners 5 spaced along the length of the rub rail assembly 1, for example about every 9-inches. The rub rail assembly 1 may also include a rail support 6 over which the rub rail is placed.

At the time of manufacture of the vehicle 2, the rub rails 3 are clamped onto the side wall surface 4, and the side wall surface is match drilled with fastener holes 7 in the rub rails. Then, the fasteners 5 are inserted through the rub rails 3 to attach the rub rail to the side wall surface 4. After fastening, the vehicle is masked a first time to paint the rub rails 3, and masked a second time to paint the vehicle. Thus, there a multiple steps in the manufacturing process of attaching the rub rail assemblies to the vehicle that may lead to additional cost and time.

SUMMARY

A rub rail assembly for a side wall surface of a vehicle includes a cleat support having a first body portion and a second body portion. The first body portion has a first fastener receiving hole for fastening the cleat support to the side wall surface of the vehicle, and the second body portion has an engagement structure. The rub rail has a hook that is engageable with the engagement structure of the support cleat to permit the rub rail to hang from the support cleat.

A cleat support for hanging a rub rail on a side wall surface of a vehicle includes a generally rectangular body having a wall-facing surface and a rail-facing surface. The body has a first body portion and a second body portion, and an offset surface disposed between the first body portion and the second body portion. The first body portion is non-planar with the second body portion. A first fastener receiving hole on the first body portion is for fastening the support cleat to the side wall surface of the vehicle. An engagement structure is disposed on the second body portion. The engagement structure is configured to engage and hang the rub rail from the engagement structure.

A method of assembling a rub rail assembly on a side wall surface of a vehicle includes the steps of attaching at least one support cleat to the side wall surface, and hanging the rub rail on the at least one support cleat, where the support cleat entirely supports the rub rail. The method also includes the step of fastening the rub rail to the side wall surface with a fastener.

BRIEF DESCRIPTION OF THE DRAWINGS

FIG. 3 is a support cleat of a rub rail assembly attached to the side wall surface of the vehicle.

FIG. 4 is a cross-section of a rub rail engaged on the support cleat of the rub rail assembly attached to the side wall surface of the vehicle.

DETAILED DESCRIPTION

Figure 2:
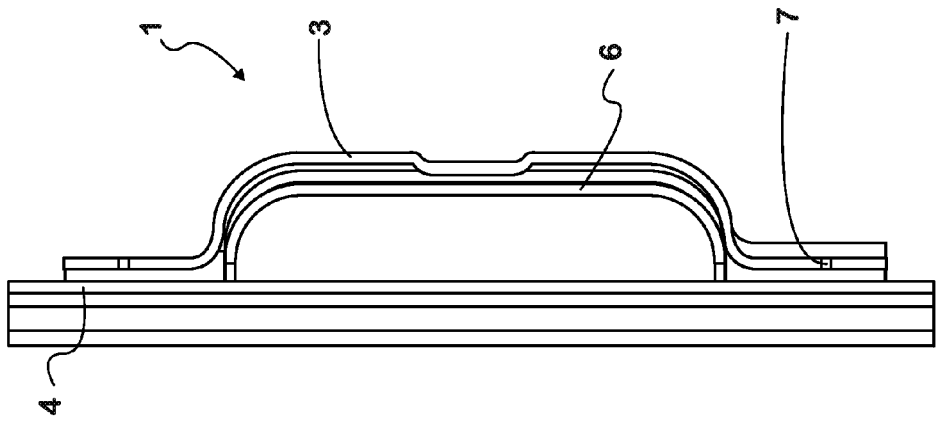
FIG. 2 is a cross-section of one of the prior art rub rail assemblies attached to the side wall surface of the vehicle.
Figure 1:
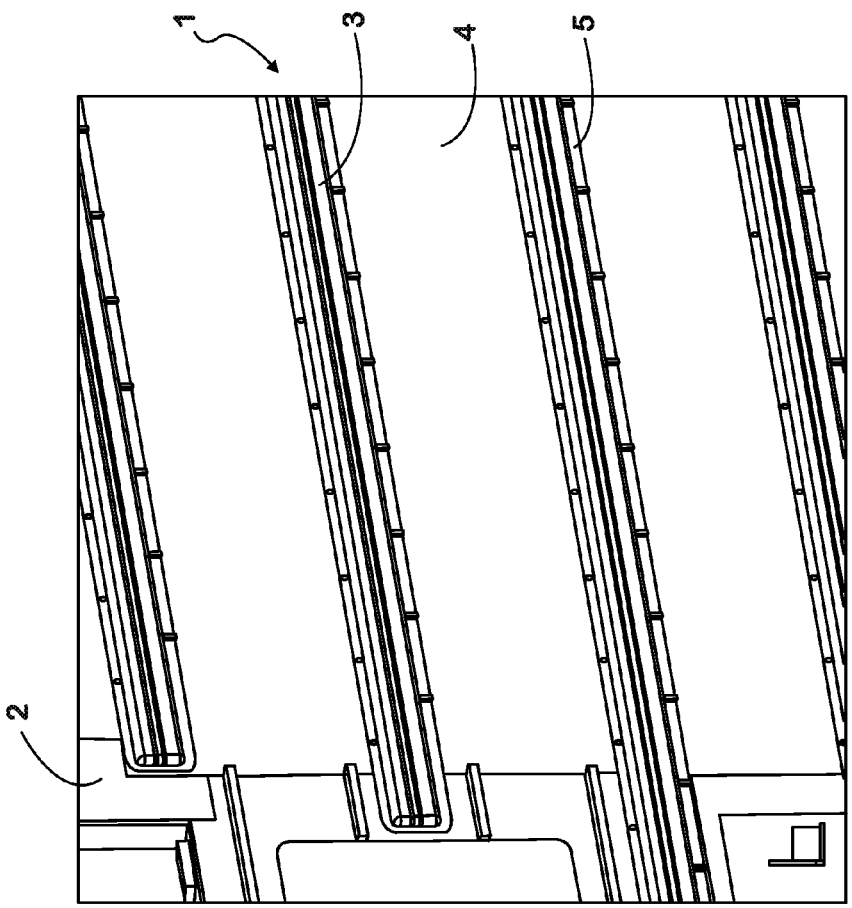
FIG. 1 is a perspective view of a vehicle having a plurality of prior art rub rail assemblies attached to a side wall surface of the vehicle.
Figure 5:
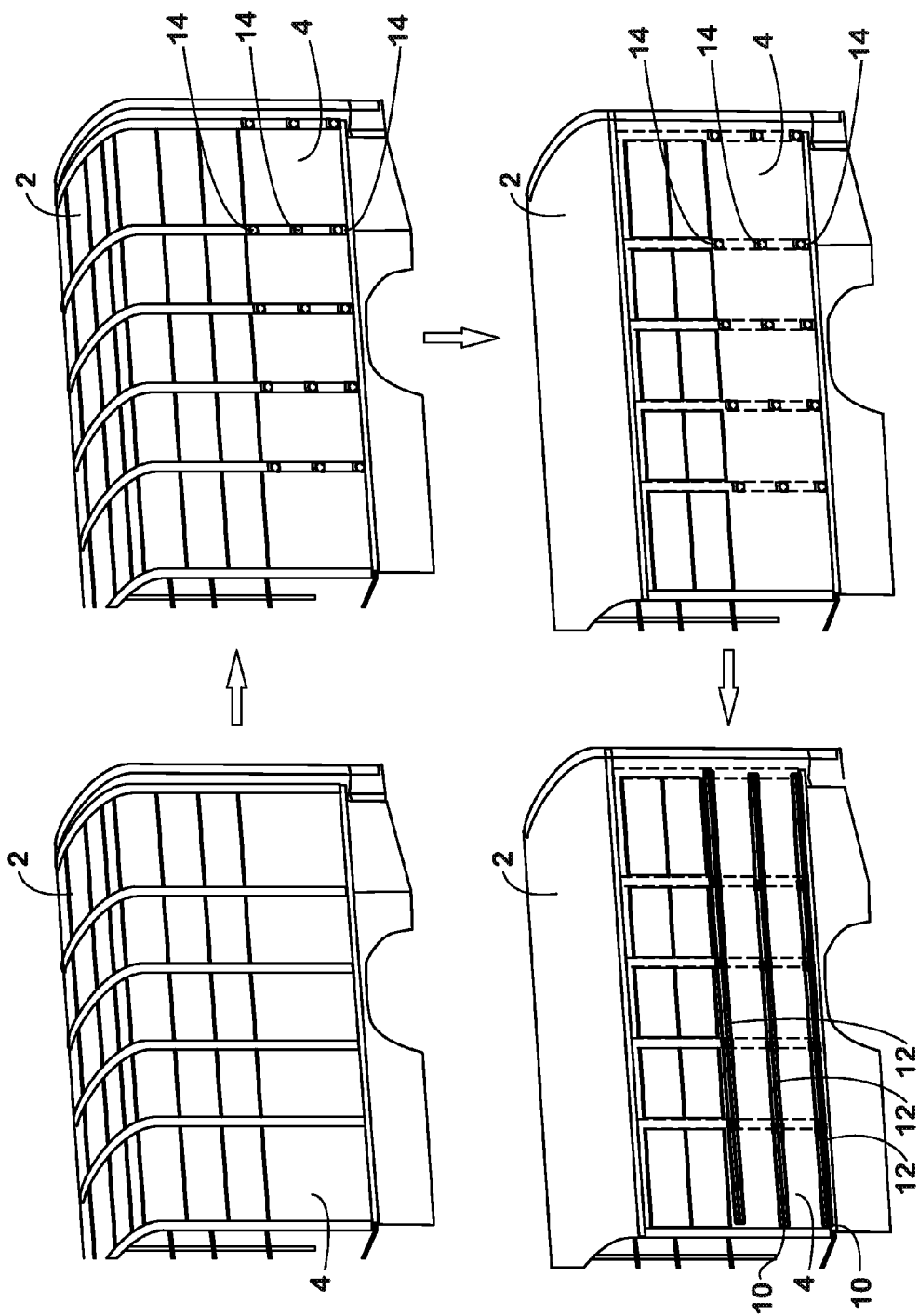
FIG. 5 is a schematic depicting the process steps for attaching the rub rail assembly onto the side wall surface of the vehicle and painting the vehicle.

Referring to FIGS. 3-5, a rub rail assembly 10 includes a rub rail 12 and a support cleat 14 that are attachable to the side wall surface 4 of the bus or other vehicle 2. While the rub rail assembly 10 will be explained with reference to use on the side wall surface 4 of a bus, it should be appreciated that the rub rail assembly 10 may be used in any vehicle or application where impacts or abrasions can occur.

The support cleat 14 may have a generally rectangular body 16 including a first edge 18, a second edge 20 generally parallel to the first edge, a third edge 22 generally perpendicular to the first edge and the second edge, and a fourth edge 24 generally parallel to the third edge. The body 16 also includes a wall-facing surface 26 and a rail-facing surface 28 opposite the wall-facing surface. The support cleat 14 may be a stamped metal, although other materials are possible.

The body 16 of the support cleat 14 includes a first body portion 30 that may be generally planar and is configured to be generally coextensive with the side wall surface 4 of the bus 2. The first body portion 30 may have at least one first fastener receiving hole 32 for receiving a first fastener 34. There may be two first fastener receiving holes 32 located in a spaced arrangement adjacent the third edge 22, and may be located near the corner of the first edge 18 and the third edge 22, and near the corner of the second edge 20 and the third edge. Other locations of the first fastener receiving holes 32 are possible. The first body portion 30 may also have at least one second fastener receiving hole 36 configured for receiving a second fastener 38. There may be two second fastener receiving holes 36 located adjacent the first edge 18 and the second edge 20, although other locations are possible. The second fastener receiving holes 36 in the support cleat 14 and side wall surface 4 accept the fastener 38 that supports the rub rail 12. The second hole in the side wall surface 4 will be drilled after the first receiving holes 32 and is self-located by the support cleat 14.

The body 16 of the support cleat 14 also includes a second body portion 40 that is offset from the first body portion 30 such that the rail-facing surface 28 at the second body portion is not in the same plane as the rail-facing surface of the first body portion. An offset surface 42 separates the first body portion 30 from the second body portion 40. The offset surface 42 may extend from the first edge 18 to the second edge 20, and may be generally V-shaped, linear, angular, curved or any other configuration. The second fastener receiving holes 36 may be located closer to the offset surface 42 than the first fastener receiving holes 32.

When the support cleat 14 is fastened to the side wall surface 4 with one or more first fasteners 34 through the one or more first fastener receiving holes 32, the first body portion 30 is configured to engage or lay generally flush against the generally planar side wall surface, and the second body portion 40 may be spaced or offset from the side wall surface (see FIG. 4). The second body portion 40 and the offset surface 42 extend from the first body portion 30 to form an engagement structure 44, such as a cleat or projection, that receives the rub rail 12. The side wall surface 4, the offset surface 42 and the second body portion 40 define a receiving space 45 for receiving the rub rail 12 therein.

The rub rail 12 is generally elongate and is configured to extend along at least a portion of the length of the bus 2. In cross-section (see FIG. 4), the rub rail 12 has a generally undulating shape with two generally outwardly extending ridges 46, 48 separated by a generally inwardly extending channel 50, although other shapes are possible. At a first edge 52 of the rub rail 12, there is a skirt 54 that extends from the second ridge 46. The second ridge 46 is generally convex, but may have a flattened or planar top surface 56. Extending from the second ridge 46 is the inwardly extending channel 50, which may have a generally flattened or planar bottom surface 58 that is configured to engage the rail-facing surface 28 of the first body portion 30 of the support cleat 14. The channel 50 includes a third fastener receiving hole 60. Extending from the channel 50 opposite from the second ridge 46 is the first ridge 48. The first ridge 48 is generally convex, but may have a generally flattened or planar top surface 62. It is possible that the first ridge 48 extends convexly outwardly a greater distance than the second ridge 46, however other configurations are possible.

A hook 64 extends from the first ridge 48 and engages with the engagement structure 44. The hook 64 may have an interior surface 66 that is configured to engage with at least the fourth or top edge 24 or the wall-facing surface 26 of the second body portion 40. Extending into the receiving space 45, the hook 64 may also engage the side wall surface 4. At least a portion of the hook 64 may be generally parallel with the bottom surface 58 of the channel 50. From the top surface 62 of the first ridge 48, and extending to an end 65 of the hook 64, the rub rail may traverse 180-degrees and may curve inwardly towards the channel, however other configurations are also possible.

The hook 64 engages the engagement structure 44 in a configuration that allows the rub rail 12 to hang from the support cleat 14 without a clamp so that the manufacturer can insert the fasteners without an additional clamping step. The rub rail 12 is hung on the at least one support cleat 14 such that the support cleat entirely supports the rub rail. It is also possible that the hook 64 mechanically grips the second body portion 40 in such a configuration that obviates the need for the hook 64 to extend into a receiving space, but still allows the rub rail 12 to hang from the support cleat 14. Once the rub rail 12 is hanging on the support cleats 14, the third fastener receiving holes 60 in the rub rail will be self-aligned with the second fastener receiving holes 36 in the support cleat and the side wall surface 4 as the support cleats serve as locating fixture device for installation, which may save labor time.

As seen in FIG. 5, the rub rail is generally elongate, and as such, the channel 50, the first ridge 46 and the second ridge 48 shown in FIG. 4 may extend the entire length or substantially the length of the rub rail. The rub rail 12 may be a roll-formed metal or may be formed of other materials, or alternately may be formed of multiple components. The rub rail 12 may also have additional corrugations or ribs.

Starting at the first step shown in FIG. 5, the side wall surface 4 of the vehicle 2 has no rub rail assembly 10. Referring to the second step shown in FIG. 5, to install the rub rail assembly 10 onto the bus 2, at least one support cleat 14 may be installed onto the side wall surface 4 using a template to ensure proper location along the side wall surface. The plurality of support cleats 14 are fastened to the side wall surface 4 through the first fastener receiving holes 32 using the first fasteners 34 (see FIG. 3). The first fasteners 32 may be Torx screws, however other types of fasteners are possible. This fastening process may be repeated along the length of the rub rail 12 at each support cleat 14.

The second fastener receiving holes 36 on the support cleat 14 can be used as a guide to match drill holes through the side wall surface 4 of the bus 2. The bus 2 and attached support cleats 14 may then be painted at the third step shown in FIG. 5.

At the fourth step shown in FIG. 5, the rub rail 12 is hung on the at least one support cleat 14 by engaging the hook 64 onto the engagement structure 44 of the support cleat 14. The rub rail 12 may be pre-painted before being hung on the support cleat 14. The third fastener receiving hole 60 on the rub rail 12 is aligned with second fastener receiving hole 36 on the support cleat 14, and the second fastener 38 is received in the third fastener receiving hole, in the second fastener receiving hole, and into the side wall surface 4. This fastening process may be repeated along the length of the rub rail 12 at each support cleat 14.

The rub rail 12 can be pre-painted and the fasteners 34, 38 can be pre-painted. With a pre-painted rub rail 12 and fasteners 34, 38 attached to the side wall surface 4, the bus 2 may only have to be masked one time while the bus is painted.

The rub rail assembly 10 may be attached to the side wall surface 4 of the bus at no more than 8-inches above the seat-cushion level (not shown), and may extend from the rear side of the entrance door (not shown) completely around the body (except at emergency or access doors), although other configurations are possible. There may be an additional rub rail assembly 10 above the floor line (not shown). Each rub rail 12 may have a width of about 4-inches or more, although other widths are possible.

The rub rail assembly 10 allows the manufacturer to assemble the rub rail 12 onto the support cleat 14 without the need for a clamp and with minimal tools required by the user. The engagement structure 44 is configured to engage and hang the rub rail 12 from the engagement structure and line up the third fastener receiving holes 60 of the rub rail with the second fastener receiving holes 36 in the cleat support 14 and sidewall surface 4 for mounting of the rub rail, which may save time and use less manpower. Also, if the rub rails 12 are pre-painted at installation, an additional painting step is eliminated.

What is claimed is:

1. A rub rail assembly for a side wall surface of a vehicle comprising:
    a cleat support having a first body portion and a second body portion, the first body portion having a first fastener receiving hole for fastening the cleat support to the side wall surface of the vehicle, the second body portion having an engagement structure; and
    a rub rail having a hook that is engageable with the engagement structure of the support cleat to permit the rub rail to hang from the support cleat, wherein the rub rail has a third fastener receiving hole that is alignable with a second receiving hole on the cleat support, wherein the second receiving hole is located at the first body portion, wherein a second fastener fastens the rub rail to the cleat support and to the side wall surface of the vehicle.

2. The rub rail assembly of claim 1 wherein the first body portion and the second body portion are separated by an offset surface.

3. The rub rail assembly of claim 2 wherein the second body portion, the offset surface and the side wall surface define a receiving space in which the hook of the rub rail is received.

4. The rub rail assembly of claim 1 further comprising a first fastener for fastening the cleat support to the side wall surface of the vehicle.

5. The rub rail assembly of claim 1 wherein the hook has an interior surface that engages with at least one of an edge and a wall-facing surface of the second body portion.

6. The rub rail assembly of claim 5 wherein the rub rail has a channel that engages the support cleat at the first portion, and a generally outwardly extending first ridge, wherein the hook extends from the first ridge and curves inwardly towards the channel.

7. The rub rail assembly of claim 6 further comprising a second outwardly extending ridge located on the opposite side of the channel as the hook, wherein a skirt extends from the second ridge.

8. The rub rail assembly of claim 6 wherein the channel has a bottom surface that is generally planar, wherein a portion of the hook is generally parallel with the bottom surface of the channel.

\* \* \* \* \*